Sept. 29, 1925.
T. H. DALTON
SEED PAN ATTACHMENT TO MOWERS
Filed Nov. 29, 1924
1,555,636
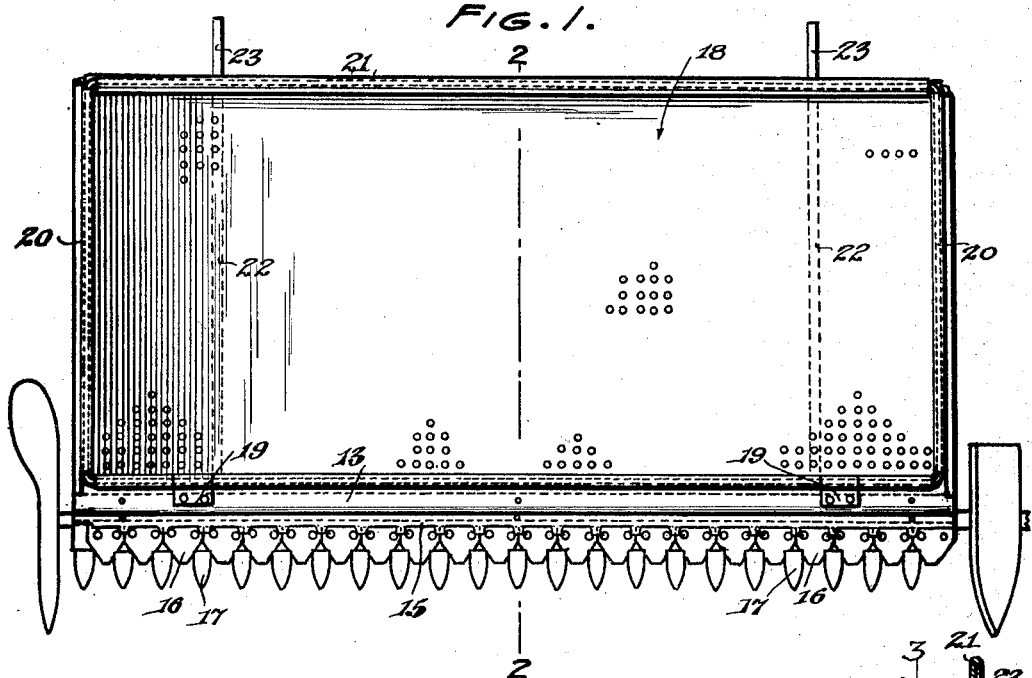
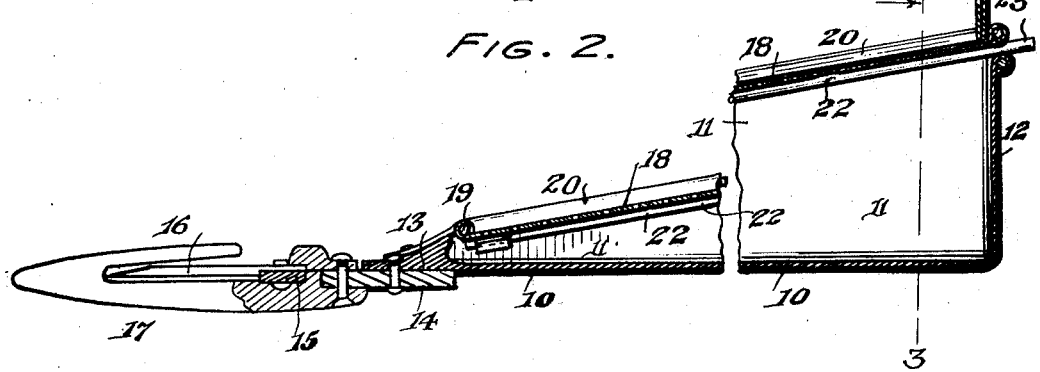
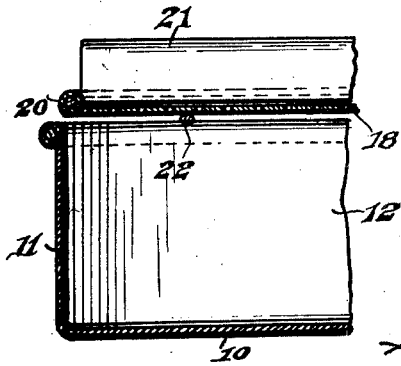
INVENTOR.
T. H. DALTON
BY
Geo. P. Kimmel
ATTORNEY.

Patented Sept. 29, 1925.

1,555,636

UNITED STATES PATENT OFFICE.

THOMAS H. DALTON, OF WATER VALLEY, MISSISSIPPI.

SEED-PAN ATTACHMENT TO MOWERS.

Application filed November 29, 1924. Serial No. 752,974.

*To all whom it may concern:*

Be it known that I, THOMAS H. DALTON, a citizen of the United States, residing at Water Valley, in the county of Yalobusha and State of Mississippi, have invented certain new and useful Improvements in Seed-Pan Attachments to Mowers, of which the following is a specification.

This invention relates to seed saving or gathering attachments to mowers, and has for one of its objects to improve the construction and increase the efficiency and utility of devices of this character.

Another object of the invention is to provide a device of this character, which may be adapted without material structural change to mowers of various construction and sizes.

With these and other objects in view, the invention consists in certain novel features of construction as hereinafter shown and described and then specifically pointed out in the claim, and in the drawings illustrative of the preferred embodiment of the invention.

Fig. 1 is a plan view of the improved device attached to the guard finger bar of a mowing machine.

Fig. 2 is an enlarged section on the line 2—2 of Fig. 1.

Fig. 3 is a section on the line 3—3 of Fig. 2, looking in the direction of the arrow.

The improved device is designed for use on mowers and like devices when employed in gathering crops wherein the seed are liable to be shelled or shaken loose, to save such shelled seeds.

The improved device comprises a receptacle, preferably of sheet metal and including a bottom 10, vertical sides 11, vertical back 12, and a front 13, the latter preferably wedge-shaped, or with its upper face inclined rearwardly and upwardly, as represented in Fig. 2. The front portion 13 of the receptacle is adapted to be attached to the guard finger bar, represented conventionally at 14, the sickle bar, sickle knives, and guard fingers being also indicated conventionally at 15-16 and 17, respectively.

The upper edges of the sides 11 of the receptacle are inclined upwardly and rearwardly whereby the receptacle increases in depth from front to rear, as shown.

The closure for the receptacle is represented at 18, of perforated sheet metal, and hingedly united at 19 to the front member 13. The sides and rear of the closure are elevated, as shown at 20 and 21, the rear elevation being greater than the side elevations.

Attached to the lower face of the closure are reinforcing handle bars 22 extended at the rear to enable the closure to be more easily elevated at the rear when the contents of the receiver are to be discharged.

In harvesting peas, clover, and the like, the seeds are liable to be shelled from the pods, and unless means are provided for saving such shelled seeds they would be deposited on the ground and lost, but by providing the receptacle with its perforated top, such shelled seeds will be deposited thereon and pass through the apertures into the receptacle. The elevated side portions 20 and the elevated rear portion 21 retard and check the flow of the stalks severed by the cutter, and thus materially facilitate the operation.

The improved device is simple in construction, can be inexpensively manufactured, and attached to any of the forms of mowers in use.

The preferred embodiment of the invention is disclosed in the drawings and set forth in the specification but it will be understood that modifications within the scope of the claimed invention may be made in the construction without departing from the principle of the invention or sacrificing any of its advantages.

Having thus described the invention what is claimed is:

A seed gathering attachment for a mower having a finger bar, comprising a receptacle, a perforated closure therefor having upturned front, rear and sides, means for attaching the receptacle to the finger bar, reinforcing handle bars attached in spaced relation to the closure and bearing upon and extending beyond the rear of the receptacle, and hinge elements connecting the closure with the receptacle.

In testimony whereof, I affix my signature hereto.

THOMAS H. DALTON.